United States Patent [19]

Fallon

[11] Patent Number: 4,483,365

[45] Date of Patent: Nov. 20, 1984

[54] INTERLOCKING MODULAR VALVE MOUNTING ASSEMBLY

[75] Inventor: Gerald J. Fallon, Southfield, Mich.

[73] Assignee: Louis G. Basso, Jr., West Bloomfield, Mich.

[21] Appl. No.: 402,457

[22] Filed: Jul. 27, 1982

[51] Int. Cl.³ ............................. F16L 3/00; F16K 1/00
[52] U.S. Cl. .................................. 137/343; 137/271; 137/884; 285/137 R
[58] Field of Search ........... 137/269, 271, 884, 561 R, 137/270, 343; 285/137 R

[56] References Cited

U.S. PATENT DOCUMENTS

| | | | |
|---|---|---|---|
| 2,927,602 | 3/1960 | Eklund | 137/343 |
| 3,521,664 | 7/1970 | Medici | 137/343 |
| 3,561,469 | 2/1971 | Kellstrom et al. | 137/343 |
| 3,707,989 | 1/1973 | Jullien-Davin | 137/884 |
| 3,879,068 | 4/1975 | Stampfli | 285/137 R |
| 3,934,605 | 1/1976 | Legris | 137/271 |
| 3,974,856 | 8/1976 | Lancier | 137/271 |
| 4,095,864 | 6/1978 | Hardin | 137/884 |
| 4,224,957 | 9/1980 | Darves et al. | 137/884 |
| 4,352,532 | 10/1982 | Hardin | 137/884 |

Primary Examiner—A. Michael Chambers
Attorney, Agent, or Firm—Cullen, Sloman, Cantor, Grauer, Scott & Rutherford

[57] ABSTRACT

A fluid valve support panel including a plurality of interlocking modules is disclosed. Each interlocking module is a rectangular planar member having a set of interlocking flanges and pockets disposed about the periphery of the panel. The pockets and flanges of adjacent panels interlock with one another to form a self-supporting set of panels. Opposite sides of the rectangular modules have inverse patterns of pockets and flanges which permit adjacent panels to be interlocked. A valve mounting plate having fluid ports formed therethrough is secured over a central aperture formed in each module. The valve mounting plate has a flat surface for receiving a valve on one side and is adapted to be secured to fluid piping means on the opposite side.

10 Claims, 8 Drawing Figures

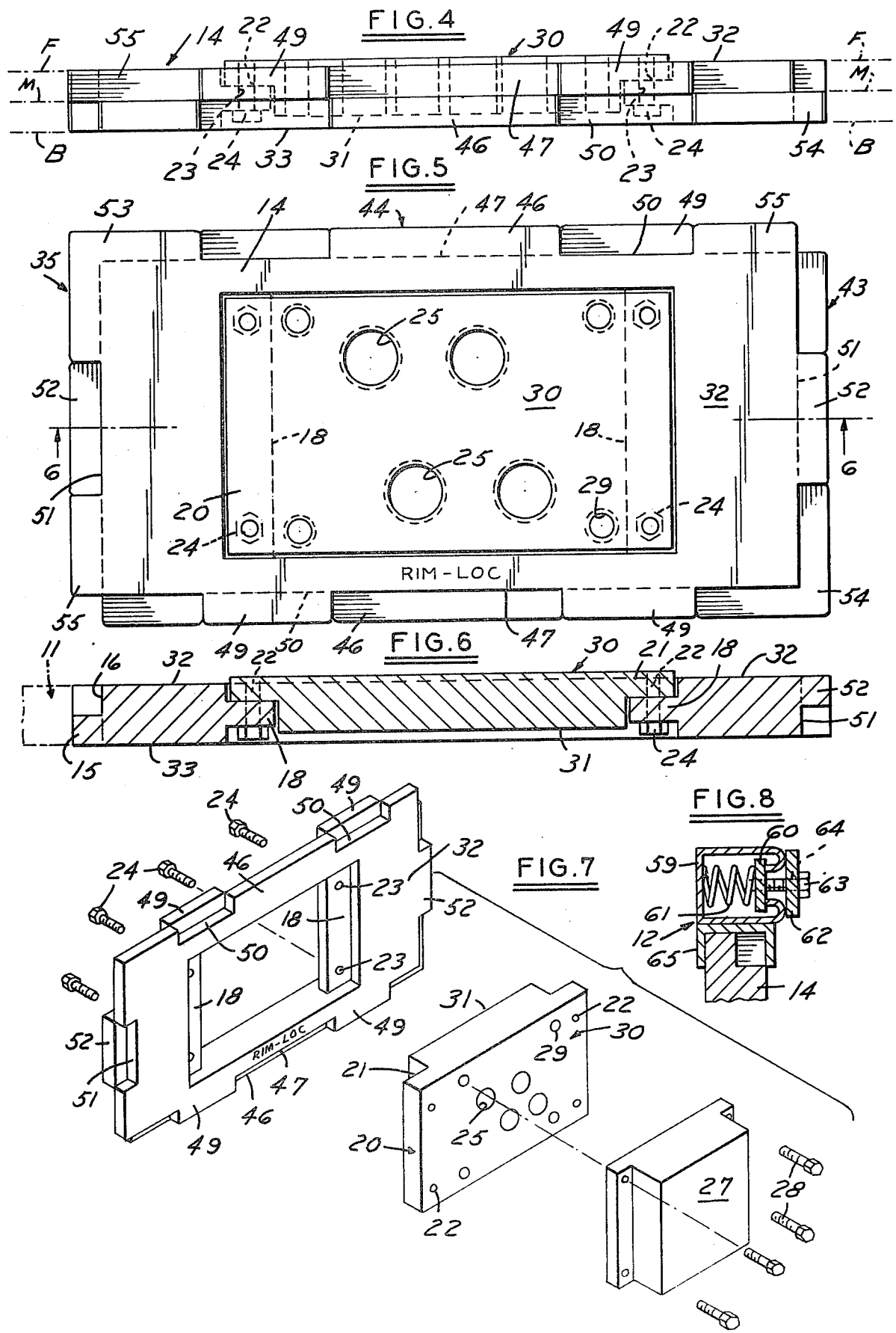

INTERLOCKING MODULAR VALVE MOUNTING ASSEMBLY

BACKGROUND OF THE INVENTION

1. Technical Field

The present invention is a panel board assembly for mounting valves used in a hydraulic system. More specifically, the panel board assembly is made up of interlocking self-supporting modules.

2. Prior Art

Conventional panel boards for fluid control valves were large steel plates that were custom bored to receive valves on one side and hydraulic fittings on the other. Each panel board was custom made to suit a particular set of valves. If a hydraulic system was changed to include new valves it was necessary to layout, bore and tap additional holes in the panel board. This operation was time consuming and resulted in considerable machine downtime. Since hydraulic valves frequently have different port arrangements, changing a valve to one of a different type frequently required drilling new holes in the panel making the units difficult to adapt to changes in the hydraulic system. As will be readily appreciated, such panel boards were heavy which made them difficult to install or relocate.

U.S. Pat. No. 2,927,602 was directed at overcoming some of the above problems encountered by conventional panel boards. The patented construction provided a panel board assembly having a plurality of standardized panel modules which were fastened together to form a panel board assembly. The modules were held together by bolts which extended through holes formed in flanges formed about the periphery of the modules. This panel board assembly was heavy and time consuming to construct.

U.S. Pat. No. 3,561,469 represents an improvement over the prior patent in that it provides for a panel board assembly made up of metal or plastic modules that are retained in H channel members. The H channels are provided on all sides of the panel board assembly and between rows of modules. The H channels were required to support the modules in the panel board assembly. The modules must be formed to close tolerances to fit precisely within the H channels since an oversized module would not fit within the channel and an undersized module was loosely held by the frame causing adverse effects on the performance of the hydraulic system. The panel board was complex in construction and required a multiplicity of parts to fabricate a single panel board.

Applicant, in an attempt to solve the problems of the prior art, had previously produced a panel board made up of modules as shown in FIG. 2. The modules included flanges that allowed the edges of adjacent modules to interlock each other in one direction. While this construction exhibited certain advantages over the prior art, the panels were not self-supporting during assembly causing problems in the construction of the panel board. In addition, since each side of a panel only interlocked with adjacent panels in a single direction the fully constructed panel board assembly was unstable.

SUMMARY OF THE INVENTION

The present invention relates to a valve panel assembly made up of interlocking modular panels that are self-supporting. The modular panels support one another by means of flanges and pockets located about the periphery of the panels which key together with adjoining panels to form a self-supporting assembly. The flanges and pockets prevent relative movement between adjacent panels except for movement together or apart. The outer edge of the assembly is supported in a frame that is in turn adapted to be mounted on a support surface. Each panel module includes an insert for receiving a fluid valve on one side and fluid piping means on the opposite side.

In the disclosed embodiment of the invention a rectangular modular panel is described which may be interengaged with other panels in a horizontal or vertical orientation. Alternatively, a square modular panel having a periphery equivalent to a multiple of interconnected rectangular modular panels may be provided to accommodate larger valves.

The valve panel assembly of the present invention requires no bars or fasteners between adjacent panels to retain the panels in place either during assembly or when the panel is in use. The interlocking flanges and pockets hold each panel securely to adjacent panels during assembly. This facilitates rapid panel construction since the workman does not need to hold the partially assembled panel together as he adds each new module.

The modular panels include a body that is molded in one piece from urethane. The body is effective to dampen vibration and act as a sound deadening member. The urethane modules are light weight, oil resistant, and durable. The panel body is inexpensive to manufacture because it is molded and requires little or no machining to produce.

Inserts are provided with ports located and sized in accordance with the requirements of various valves. Inserts with port locations and valve mounting holes to suit valve manufacturer specifications can be inventoried to allow quick changeover from one valve type or size to another. The inserts can be replaced in a module, to change from one type of valve to another, without disrupting the entire valve panel assembly.

The objects and advantages of the present invention will be more readily understood upon reading the following detailed description of the invention taken in conjunction with the drawings.

BRIEF DESCRIPTION OF THE DRAWINGS

FIG. 4 is a plan view of a valve support panel.

FIG. 5 is a rear elevational view of a valve support panel.

FIG. 6 is a sectional view taken along the line 6—6 in FIG. 5.

FIG. 7 is an exploded perspective view of a valve support panel including a valve.

FIG. 8 is a sectional view of the frame taken along line 8—8 in FIG. 1.

DETAILED DESCRIPTION

Figure 1:
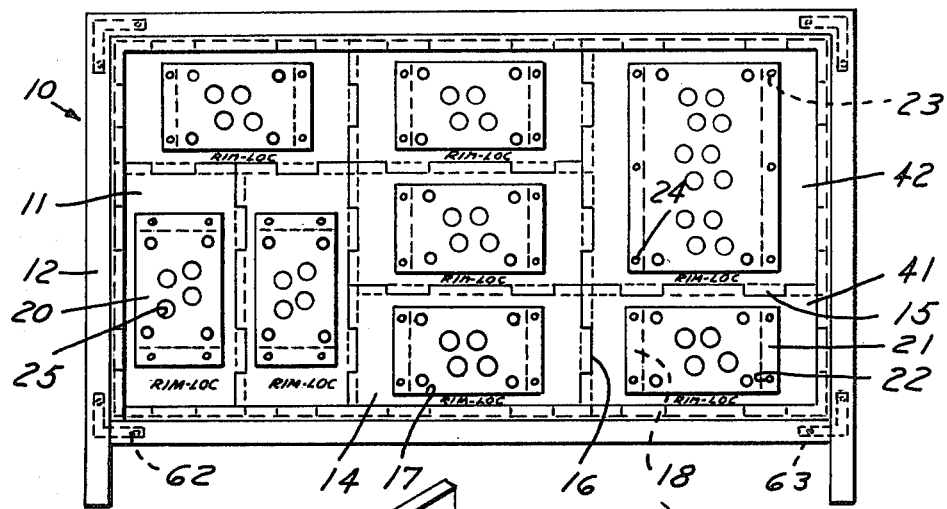
FIG. 1 is a front elevational view of the modular valve support panel assembly.
Figure 2:
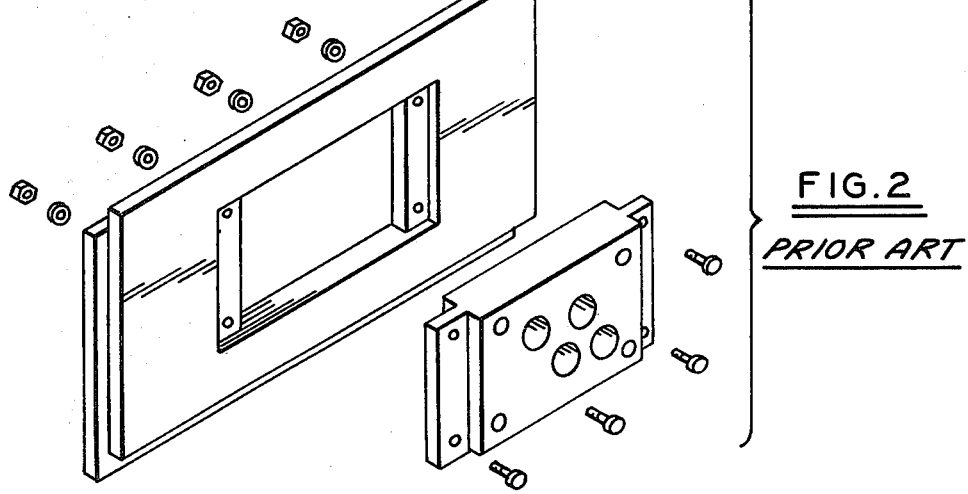
FIG. 2 is an exploded perspective view of a prior art modular valve support panel.
Figure 3:
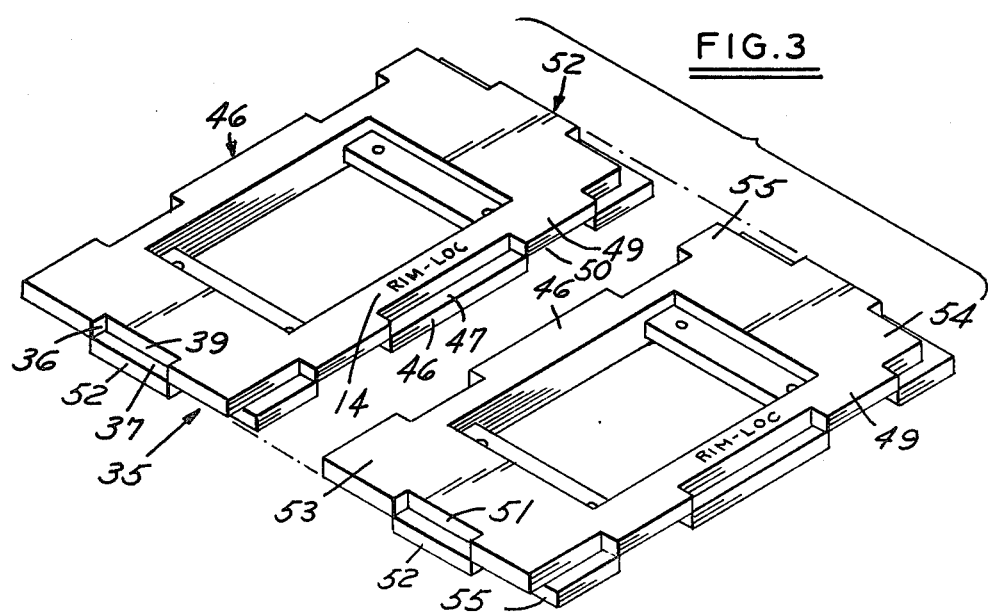
FIG. 3 is a perspective view of two modular valve support panels.

Referring now to FIG. 1, a modular valve support panel assembly is generally indicated by the reference numeral 10. The assembly 10 is made up of a plurality of modular panels 11, or modules, that are interlocked together and retained within a frame 12.

Each of the modular panels-11 includes a body 14 having a plurality of flanges 15 and pockets-16 formed about the perimeter of the body 14. The flanges 15 and pockets 16 are adapted to key together with mating flanges 15 and pockets 16 of adjacent modules. The flanges 15 and pockets 16 interact to make a set of interlocked modular panels 11 self-supporting. The body 14 includes a central aperture 17 that is flanked on two sides by two mounting flanges 18.

The body 14 is molded from urethane in a reaction injection molding process. The mold (not shown) includes a top plate, bottom plate and two contour defining center plates that form a closed space during the molding process and are separable for removing the body 14 after curing.

Each modular panel 11 includes an insert 20 which acts as a valve mounting plate. The inserts 20 are preferably machined from aluminum and subsequently hard anodized. The inserts 20 include two front flanges 21 extending from opposite sides corresponding to the location of the mounting flanges 18 on the body 14. The front flanges include tapped holes 22 that are aligned with holes 23 in the body 14 to receive bolts 24 therethrough which secure the insert 20 to the body 14. In the disclosed embodiment, the mounting flanges are centered in the body 14 so that the insert 20 may be attached to either side of the body 14. The inserts 20 include a plurality of ports 25 which may be threaded and are arranged in a pattern corresponding to the base plates of commercially available valves 27.

The valves 27 as shown in FIG. 7 are secured to the inserts 20 by means of bolts 28 that are received in tapped holes 29 in the inserts 20. The insert 20 includes a flat front face 30 that is adapted to received the valve 27 thereon in a sealed relationship. The valves 27 are fluid power valves that receive hydraulic fluid from a pressure source and control the direction of flow of fluid to hydraulic cylinders or other hydraulic devices. The back 31 of the insert 20 receives a fluid fitting (not shown) on each of the ports 25. The fittings are in turn engaged by hydraulic tubing or manifolding means as required by the fluid circuit.

Referring now to FIGS. 4, 5, and 6, the body 14 is shown to include a front face 32 and a back face 33 on opposite, parallel sides. A central plane M bisects the body 14 intermediate the front face 32 and back face 33.

Each flange 15 comprises an end face 35, at least one side wall 36, and an inner wall 37 lying in the central plane-M. The flanges 15 are co-located to define the pocket 16 between two or more contiguous flanges 15. The pockets comprise a base wall 39 with its sides being defined by side walls 36 and the inner wall 37 of the flange 15 located on the opposite side of the central plane M from the pocket 16.

The flanges 15 and pockets 16 are arranged about the rim of the body 14 in an alternating pattern. As shown in FIG. 4, flanges 15 located between the central plane M and a plane F of the front face 32 form the inner wall 37 of a pocket 16 between the central plane and a plane B of the back face 33. Similarly, flanges 15 located between the plane B and the central plane M define the inner wall 37 of pockets 16 lying between the central plane M and plane F. The flanges 15 and pockets 16 lying between the plane F and central plane M are rotated 180° relative to the flanges 15 and pockets 16 located between the central plane M and plane B. One side of the modular panel 11 is thereby designed to receive in mating relationship the opposite side of an adjacent modular panel 11 in an interfitting relationship.

The flanges 15 and pockets 16 engage one another so that the end face 35 of a flange 15 abuts the base wall 39 of a pocket 16. The side walls 36 of the mating panels are aligned with each other in parallel relationship while the inner walls 37 of interlocking panels are aligned in parallel abutting relationship. In this way adjacent panels support one another to prevent front to back relative movement and to limit lateral movement to movement in one direction toward and away from one another as required for assembly.

The modular panels 11 may be either rectangular modules 41 or square modules 42, as shown in FIG. 1. Rectangular modules 41 include two unitary sides 43 and two double sides 44. Unitary sides 43 in the disclosed embodiment include three flanges 15 and three pockets 16 aligned on opposite sides of the central plane 34 as previously described. The unitary side 43 of one panel is adapted to receive the unitary side of an abutting panel. A double side 44 is equivalent to two unitary sides 43 placed side to side and in the disclosed embodiment includes five flanges 15 and five pockets 16 arranged alternately about the central plane M as previously described. The double side 44 includes a center flange 46 which is equivalent in size to two of the flanges located on a unitary side 43. The center flange 46 is aligned on the opposite side of the central plane M from a center pocket 47 and is adapted to receive two flanges 15 of the unitary side 43 in abutting relationship. The double side 44 includes two intermediate flanges 49 on opposite sides of the center pocket 47 that are sized to be received within the center pocket 51 of a unitary side 43. Likewise, intermediate pockets 50 are provided on either side of the center flange 46. The intermediate pocket 50 is sized to receive a center flange 52 of the unitary side 43.

The rectangular modules 41 may be oriented either vertically or horizontally, as shown in FIG. 1. In the horizontal orientation the front face 32 has the insert 20 and valve 27 assembled thereon to extend from the front of the assembly 10. In the vertical orientation the back face 33 has the insert 20 and valve 27 assembled thereon to extend from the front of the assembly 10. In either case the double flange corner 53 is in the upper left corner of the panel when assembled. To assist the workman assembling the modules the body may be marked on the front face 32 adjacent one of the double sides to indicate the proper orientation for horizontally disposed panels. Similarly the back faces 33 may be marked adjacent one of the unitary sides with appropriate indicia to indicate that the panel when vertically oriented should be positioned with the proper side up. In the preferred embodiment this is done by marking the Fallon Industries trademark "Rim-Loc" on the front face and back face so that it is readable only when properly aligned.

In the disclosed embodiment each front face 32, back face 33, unitary side 43 and double side 44 includes a double flange corner 53, a flangeless corner 54 and two single flange corners 55. The double flange corner 53 being located on the opposite diagonal corner of the front face from the flangeless corner 54. The single flange corners 55 on the front face 32 are located on opposite diagonal corners. The single flange corners 55 of the front face and back face are located on opposite sides of the central plane from the oppositely oriented single flange corner located on the front face 32. As will be appreciated from the above description, the flangeless corner of one face is backed on the opposite side of the central plane by a double flange corner 53.

As shown in FIG. 8 the frame 12 is comprised of a frame channel 59 having an opening directed toward the back of the valve panel assembly 10. Nuts 60 are received in the frame channel and are supported on springs 61 or the like which hold the nuts in engagement with the reversely bent ends of the frame channel 59. The frame members interconnect with adjacent perpendicular frame members by means of an L-bracket 62. The L-brackets 62 are held in place by means of bolts 63 that are received through holes 64 in the L-bracket 62 to engage the nut 60. On the inner side of the frame channel 59 the interior channel 65 is welded or otherwise fastened. The interior channel 65 is open toward the inner part of the frame to receive the modular panels 11. As seen in FIG. 1, the modular panels 11 extend into the interior channel 65 and are held in place by the interior channel 65.

The frame 12 assists in construction of the device since the L-brackets 62 may be attached to the frame channel to hold the frame members slightly apart, thereby providing room for the modules to be shifted laterally relative to each other as they are secured together.

The valve panel assembly 10 is simply assembled by interlocking the modular panels. As shown in FIG. 1 the rectangular modular panels 41 can be oriented either horizontally or vertically and the unitary side 43 of adjacent rectangular modules interfit with one another as do the double sides 44 of adjacent rectangular modules 41. Square modules 42 are adapted to receive either the unitary side 43 of two rectangular modules 41 or may be interfit with the double side 44 of a rectangular modules 41. When two rectangular modules are arranged with their unitary sides 43 engaging a double side 44 of either a rectangular module 41 or a square module 42 the abutting double sides 44 of the rectangular modules 41 must be first assembled together to thereby allow sliding engagement with the double side 44.

The valve panel assembly 10 as shown in FIG. 1 would be built up by first loosely assembling the two sides and bottom of the frame 12 together by securing the L-brackets 62 in the lower corners with the nuts 60 and bolts 63. The rectangular module 41 in the lower right hand corner as viewed in FIG. 1 is interfit with the square module 42 immediately above. Next, the three rectangular modules aligned in the center portion of the frame are assembled together on their double sides 44 by stacking one on top of the other. The three rectangular modules 41 are then slid as a unit into engagement with the abutting sides of the square module 42 and rectangular module 41 of the right hand row. Next, the vertically oriented modules are assembled together. The rectangular module 41 in the top left hand corner is then assembled to the abutting unitary sides 43 of the vertically arranged rectangular modules. The assembly comprising the two vertically arranged modules and the horizontally arranged rectangular module is then slid into engagement with the middle row of modules. After the modules are assembled together in this fashion the modular assembly is placed in the frame and the right and left sides of the frame are then moved into tight engagement with the bottom frame member and the top frame member is placed on the frame and secured by means of the L-bracket 62.

Dummy modules having a plain insert 20 which does not include any ports 25 or holes 29 for securing a valve 27 may be provided to fill a panel assembly 10 that would otherwise have a non-rectangular periphery. Dummy modules may also be used to allow panel assemblies to be built which are to be added to subsequently.

Valves 27 can be replaced by simply removing a defective valve from its insert 20. If one type of valve is substituted for another type the insert 20 and valve 27 may be removed as a unit and replaced with the desired combination.

It should be readily appreciated that the construction of the valve panel assembly is simply achieved without the need for fasteners or support bars to hold the panels in place either during construction or after assembly into the frame. As the modular panels 11 are placed into engagement with one another they form a self-supporting body which facilitates easy construction since the assembled panels hold themselves together as panels are added.

It should also be appreciated that additional modules may be added by simply increasing the length or height of the frame members. The valve panel assembly offers exceptional versatility in that the modules may be arranged in either vertical or horizontal orientation and large valves may be accommodated on larger modules such as the square modual 42. Likewise, it should be readily appreciated that larger modules sized as multiples of the basic rectangular module 41 may be made according to the present invention to accommodate any size valve within the modular system. While the valve panel assembly has been described with reference to hydraulic systems, it may also be used to mount air valves or other devices.

Having fully described an operative embodiment of the invention, I now claim:

1. A valve mounting assembly comprising a plurality of panels interfit together to be self-supporting wherein each panel further comprises:
   a body having opposing front and back planar sides;
   edge portions formed about the periphery, defining a top, a bottom, a first end, and a second end;
   said front planar side being adapted to receive a valve, said back planar side being adapted to receive piping means;
   said panel having a plurality of holes extending therethrough for connecting the piping means in fluid flow relationship with the valves; and
   a plurality of peripherial flanges extending outwardly from each of said top, bottom, first end, and second end of said edge portions and defining a plurality of pockets wherein said flanges and said pockets of the panel interfit with pockets and flanges of adjacent panels respectively located at the top, bottom, first end and/or second end of said panel.

2. The valve mounting assembly of claim 1 wherein said flanges on the top of said panel are adapted to be received within the pockets of the bottom of a first adjoining panel while the flanges of the bottom of the first adjoining panel are received within the pockets of the top of said panel, and the flanges of the first end of said panel are adapted to be received within the pockets of a second end of a second adjoining panel while flanges of the second end of the first adjoining panel are received within the pockets of the first end of said panel.

3. The valve mounting assembly of claim 2 wherein said flanges on the perimeter of adjoining panels interlock with one another to support each other and to resist disengagement.

4. A valve mounting assembly comprising a plurality of panels interfit together to be self-supporting wherein each panel further comprises:
a body having opposite front and back planar sides;
edge portions formed about the periphery, defining a top, a bottom, a first end, and a second end;
said front planar side being adapted to receive a valve, said back planar side being adapted to receive piping means;
said panel having a plurality of holes extending therethrough for connecting the piping means in fluid flow relationship with the valves;
a plurality of flanges extending outwardly from each of said top, bottom, first end, and second end of said edge portions and defining a plurality of pockets wherein said flanges and said pockets interfit with pockets and flanges of adjacent panels respectively;
said flanges on the perimeter of adjoining panels interlocking with one another to support each other and resist disengagement; and
two of said panels being joined with the top of one panel engaging the bottom of the other panel causing two of the first ends to be located side by side to form a pattern of pockets and flanges equivalent to the top of a panel and causing two of said second ends to be located adjacent one another to form a pattern of pockets and flanges equivalent to the bottom of a panel, whereby two of said panels may be rotated 90° and assembled to adjoining panels.

5. The valve mounting assembly of claim 4 further comprising a frame defined by rigid channel members being partially U-shaped in cross-section and being inwardly open, said frame extending about the plurality of panels to prevent relative movement between said panels.

6. The valve mounting assembly of claim 4 wherein said panels include inserts of hard anodized aluminum mounted in apertures formed through said panels, said inserts having said means for mounting valves on a first side and the piping means on a second side.

7. The valve mounting assembly of claim 4 wherein at least one double panel is provided having a perimeter defined by four surfaces, with two surfaces having flanges arranged in a first pattern and two surfaces having flanges arranged in a second pattern, said first pattern being substantially identical to the top of a panel and said second pattern being identical to the bottom of a panel, said two surfaces having the first pattern being disposed on perpendicularly disposed, contiguous sides.

8. A panel for mounting a valve comprising:
a body, rectangular in shape and having opposing front and back planar surface, and a perimeter having first and second ends, a top, and a bottom, said body further defining an aperture extending from said front planar surface through to said back planar surface;
an insert plate mounted on said body extending across the aperture;
a plurality of flanges being substantially rectangular in shape and extending outwardly from each of the first and second ends, top and bottom of said body;
a front set of said flanges having one side in the same plane as said front planar surface and one side lying in a central plane disposed halfway between said front planar surface and said back planar surface;
a back set of said flanges having one side in the same plane as said back planar surface and one side lying in said central plane;
said front set of flanges and back set of flanges being disposed in an alternating pattern, about the perimeter of said body wherein said flanges on said first end and second end extend outwardly from the body inversely, to permit the flanges of the first end to be received between the flanges of the second end of an adjoining panel, and said flanges on said top and bottom extend outwardly from the body inversely, to permit the flanges of the bottom to be received between the flanges of the top of an adjoining panel.

9. In the panel of claim 8 wherein said top defines a pattern of flanges substantially identical to the adjoining first ends of two interlocked panels and said bottom defines a pattern of flanges substantially identical to the adjoining second ends of two interlocked panels.

10. In the panel of claim 8 wherein said insert plate is a standardized valve mounting plate adapted to receive a valve on a front surface and piping means on a back surface, said insert plate having a plurality of holes formed to interconnect the valve with the piping means for fluid flow therebetween.

* * * * *